Oct. 18, 1960  R. M. SHAW, JR  2,956,609
BENDING MACHINES
Filed Nov. 18, 1958  16 Sheets-Sheet 3
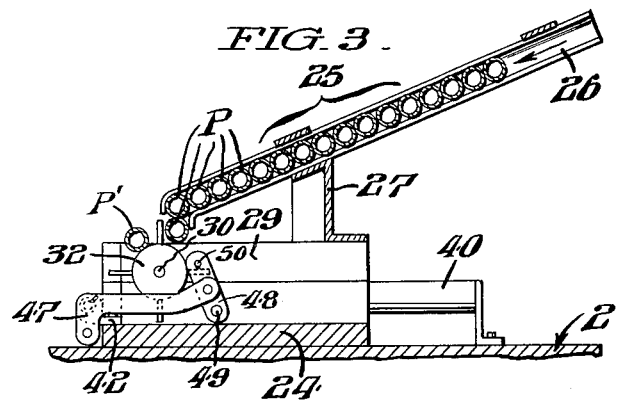
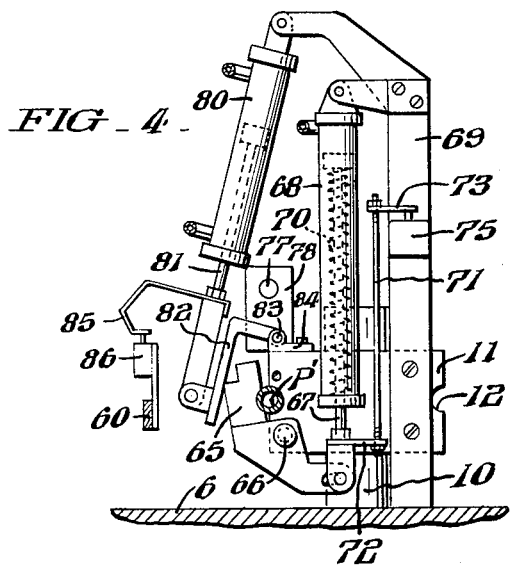
INVENTOR.
Ralph M. Shaw, Jr.,
BY Paul & Paul
ATTORNEYS.

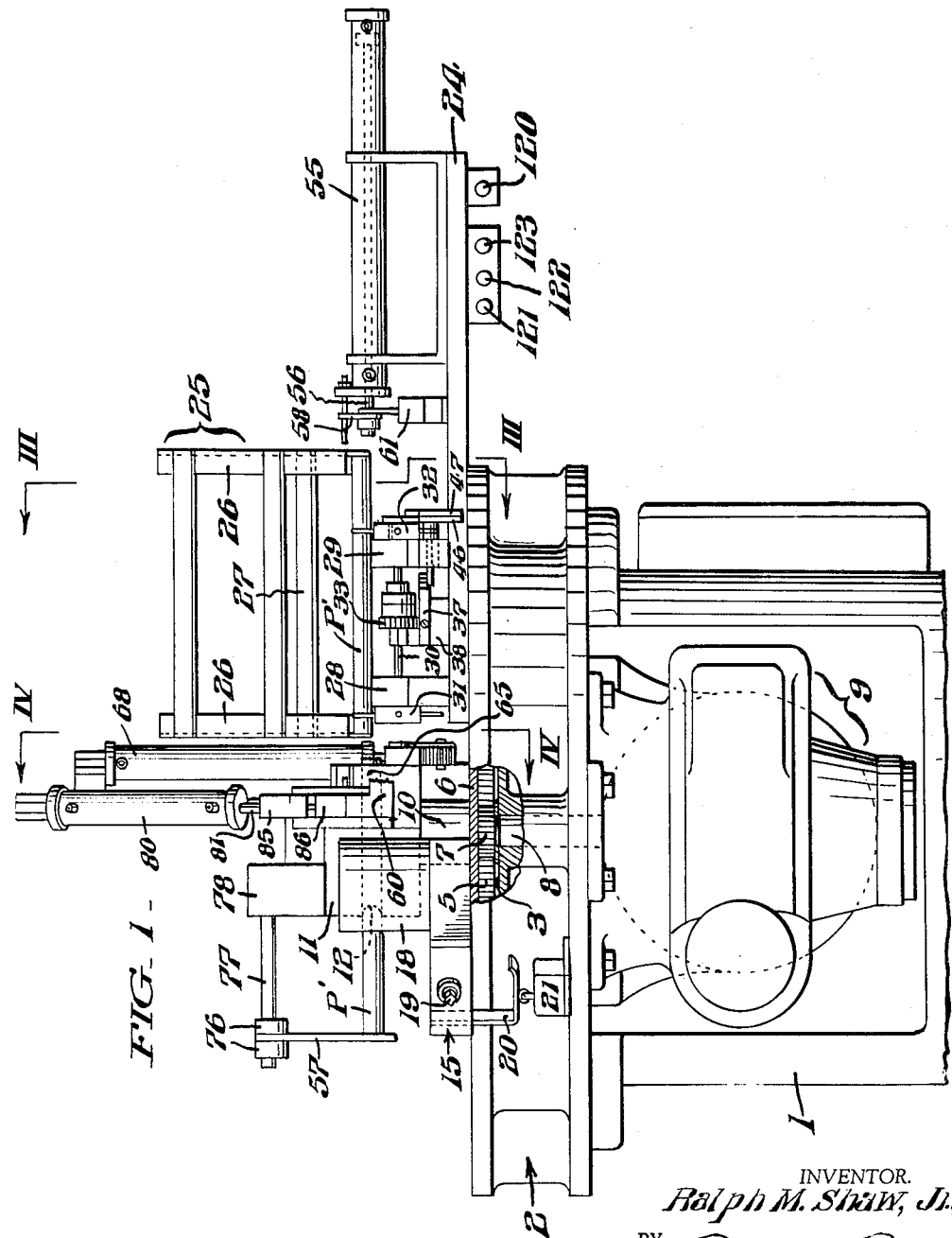

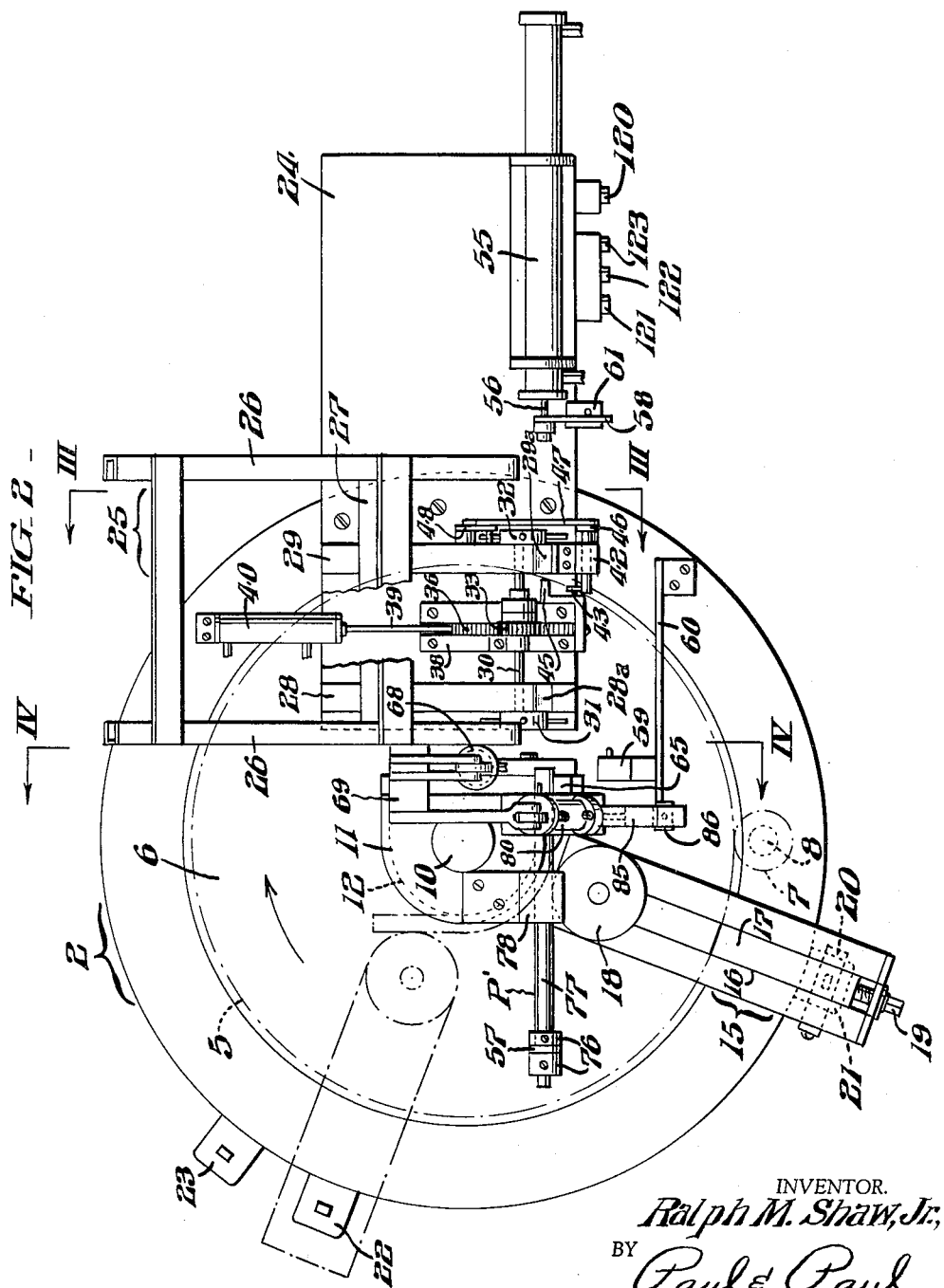

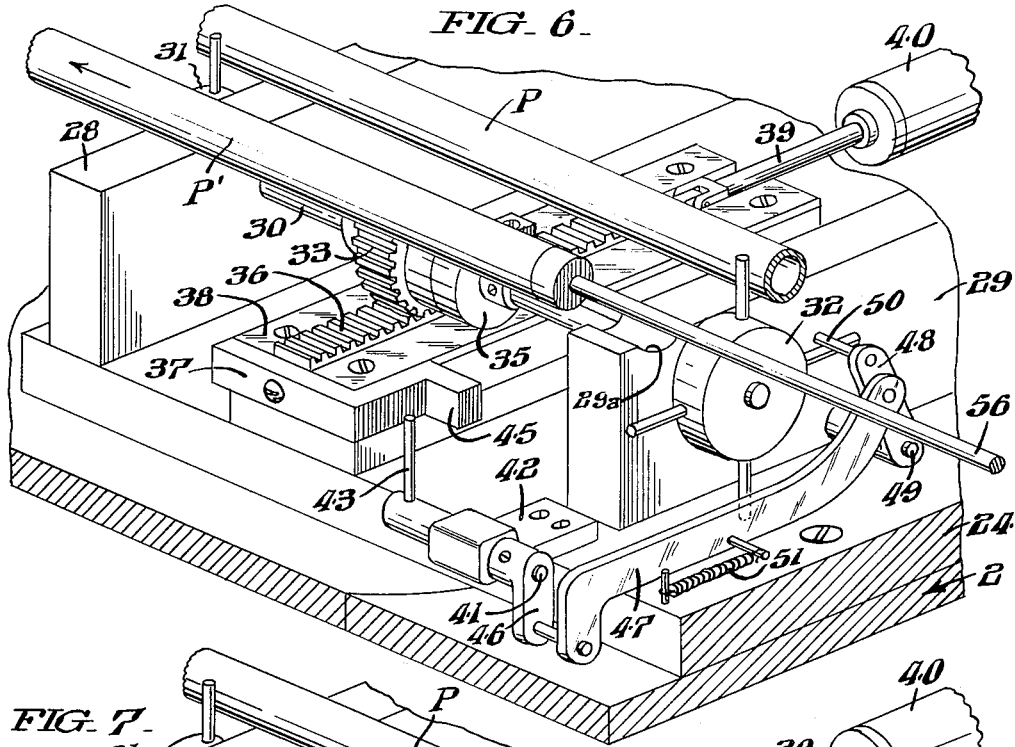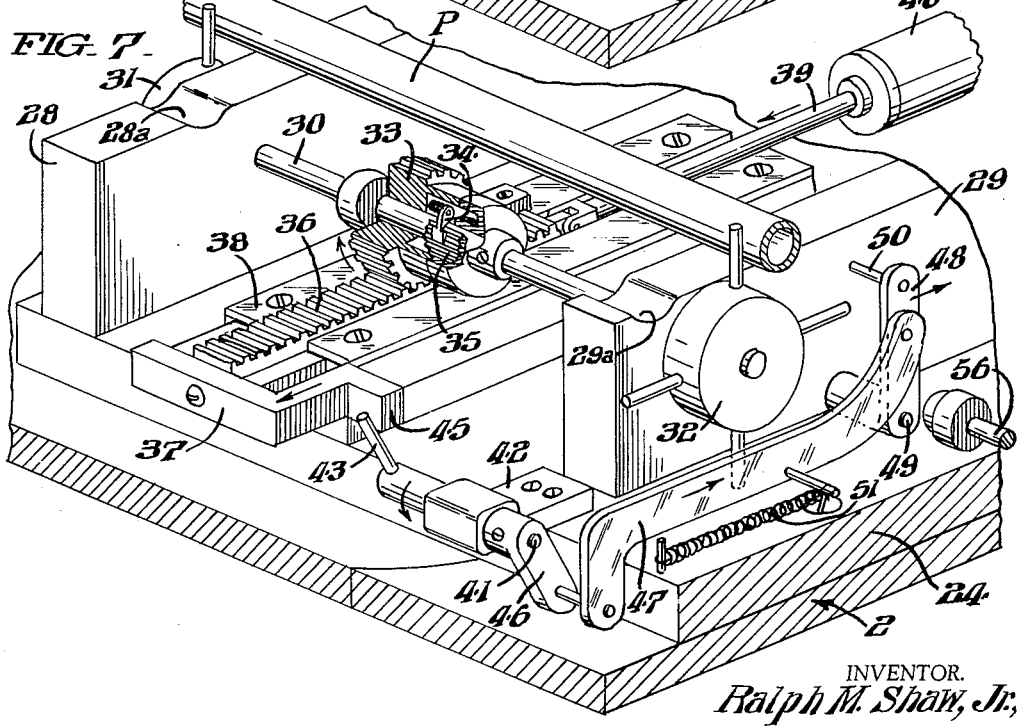

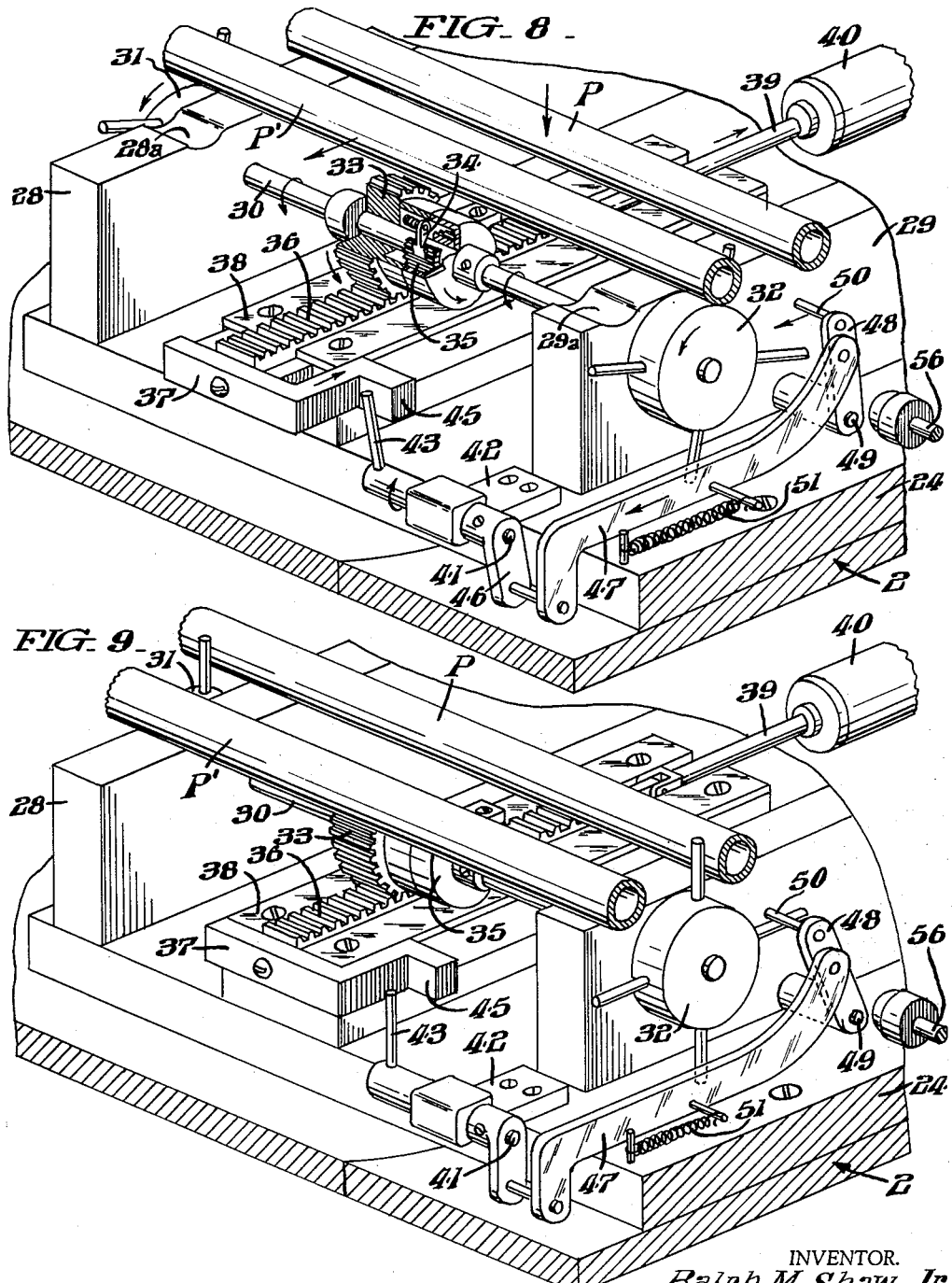

Oct. 18, 1960 — R. M. SHAW, JR — 2,956,609
BENDING MACHINES
Filed Nov. 18, 1958 — 16 Sheets-Sheet 6

INVENTOR.
Ralph M. Shaw, Jr.,
BY Paul & Paul
ATTORNEYS.

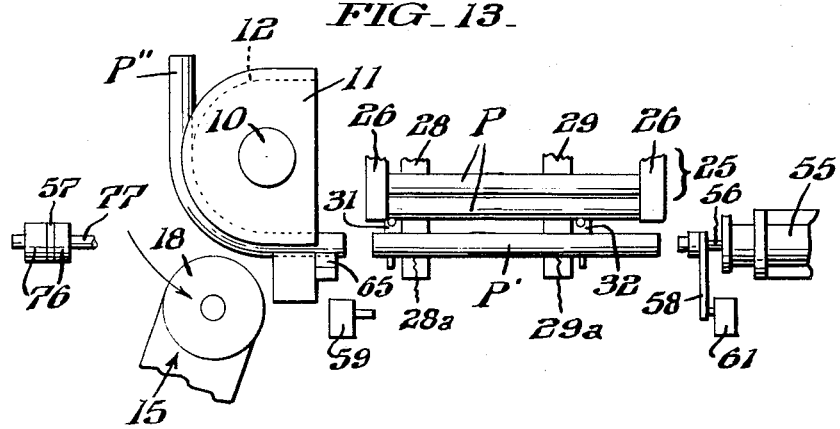
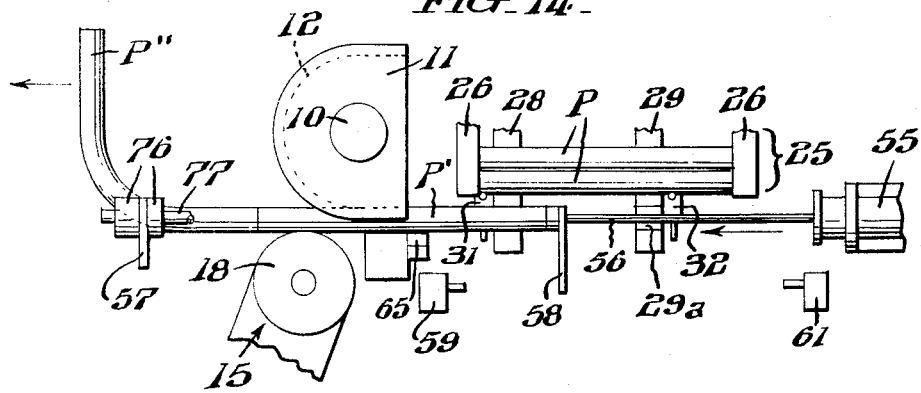
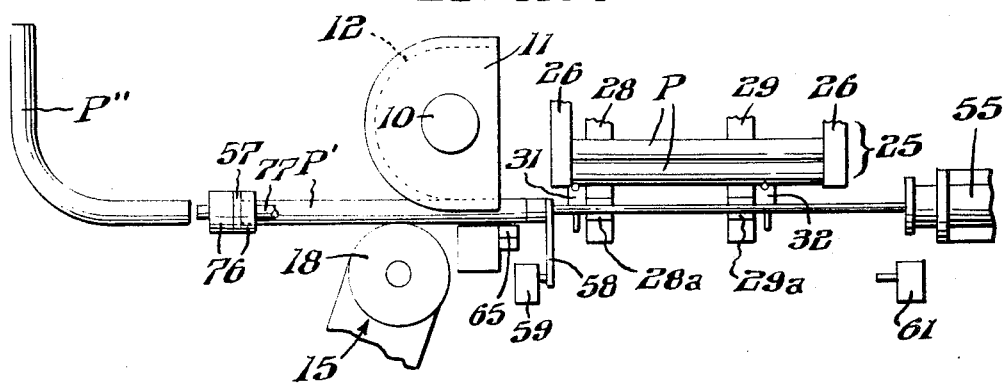

Oct. 18, 1960
R. M. SHAW, JR
2,956,609
BENDING MACHINES
Filed Nov. 18, 1958
16 Sheets-Sheet 8
FIG-16-
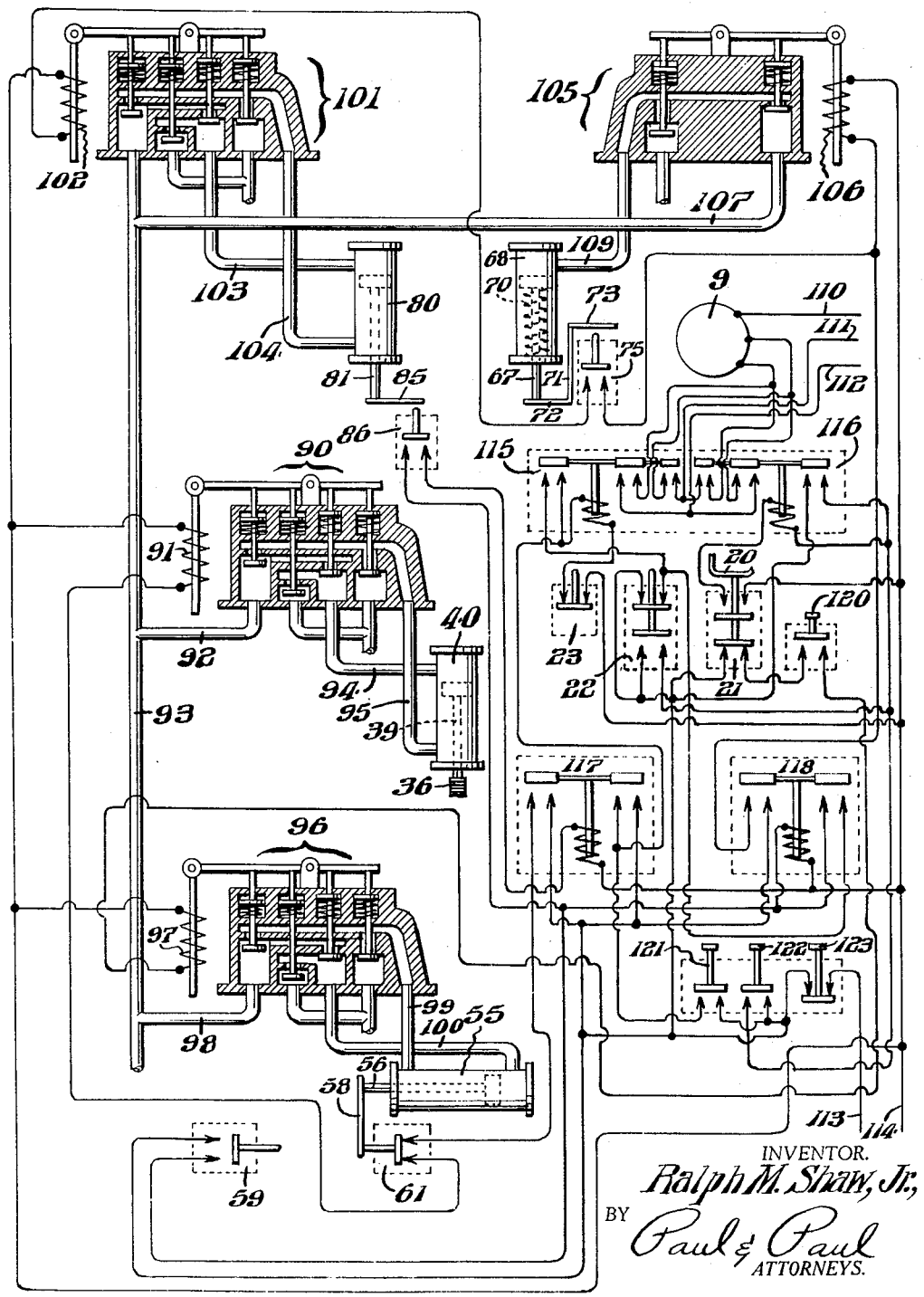
INVENTOR.
Ralph M. Shaw, Jr.,
BY
Paul & Paul
ATTORNEYS.

Oct. 18, 1960 — R. M. SHAW, JR — 2,956,609
BENDING MACHINES
Filed Nov. 18, 1958 — 16 Sheets-Sheet 9
FIG_17_
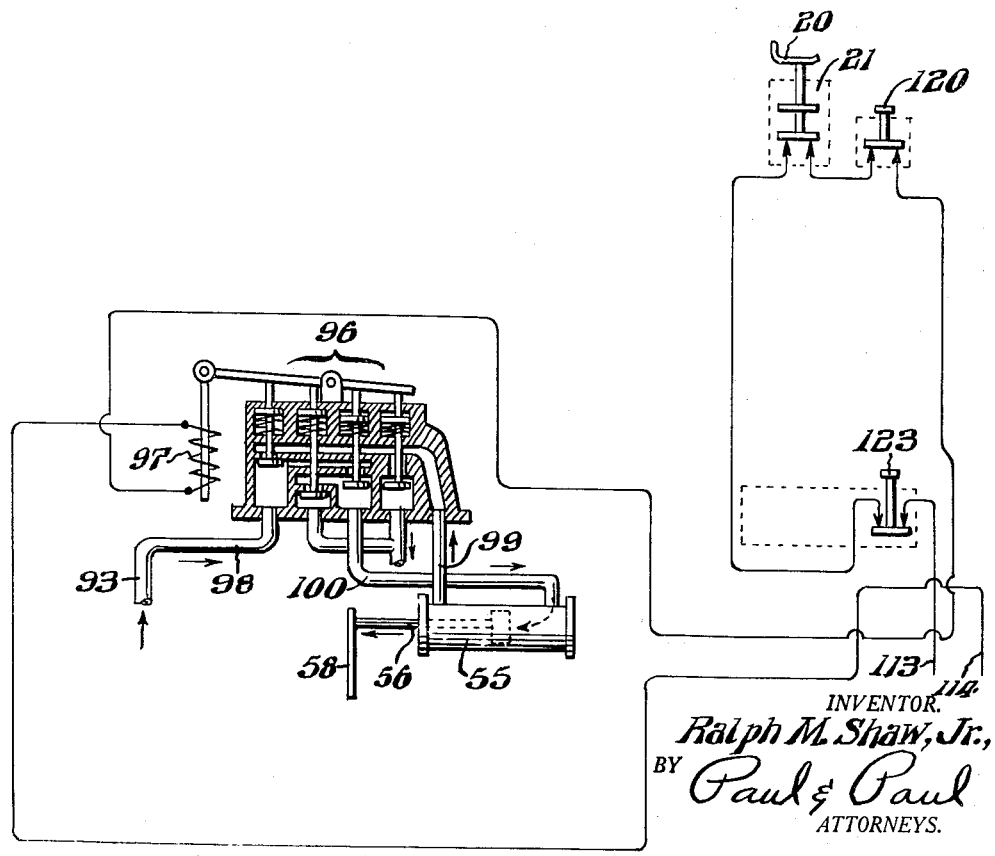

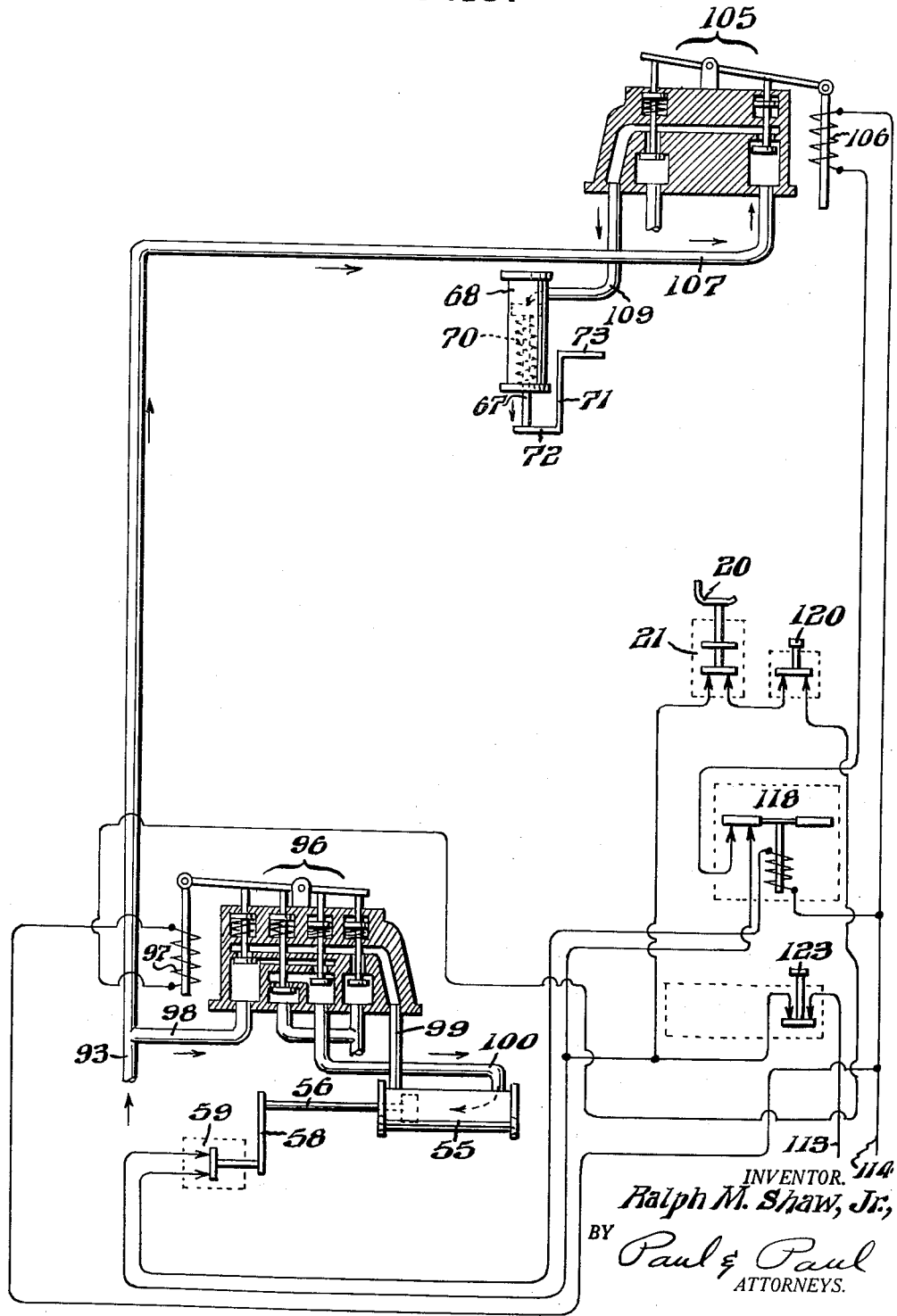

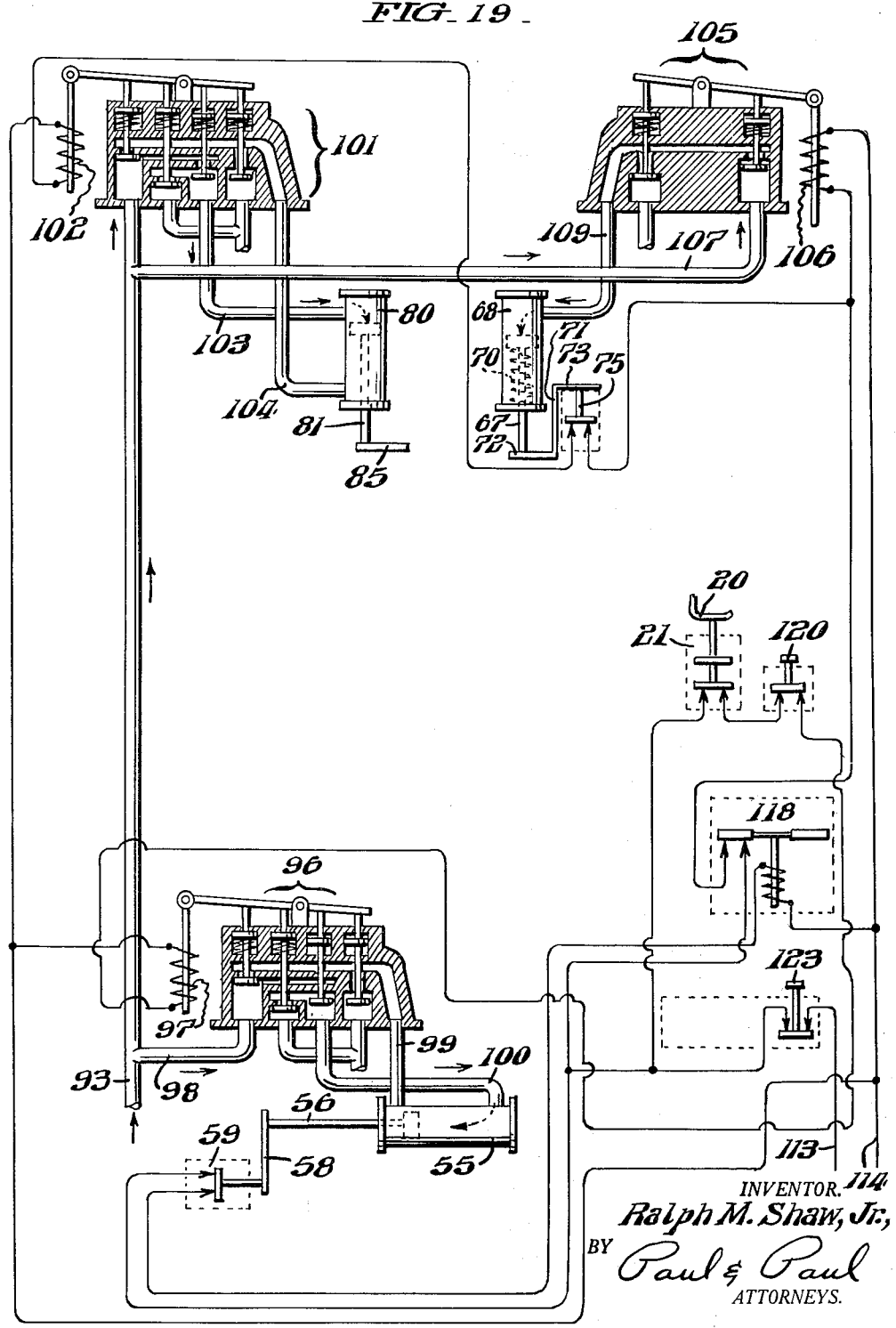

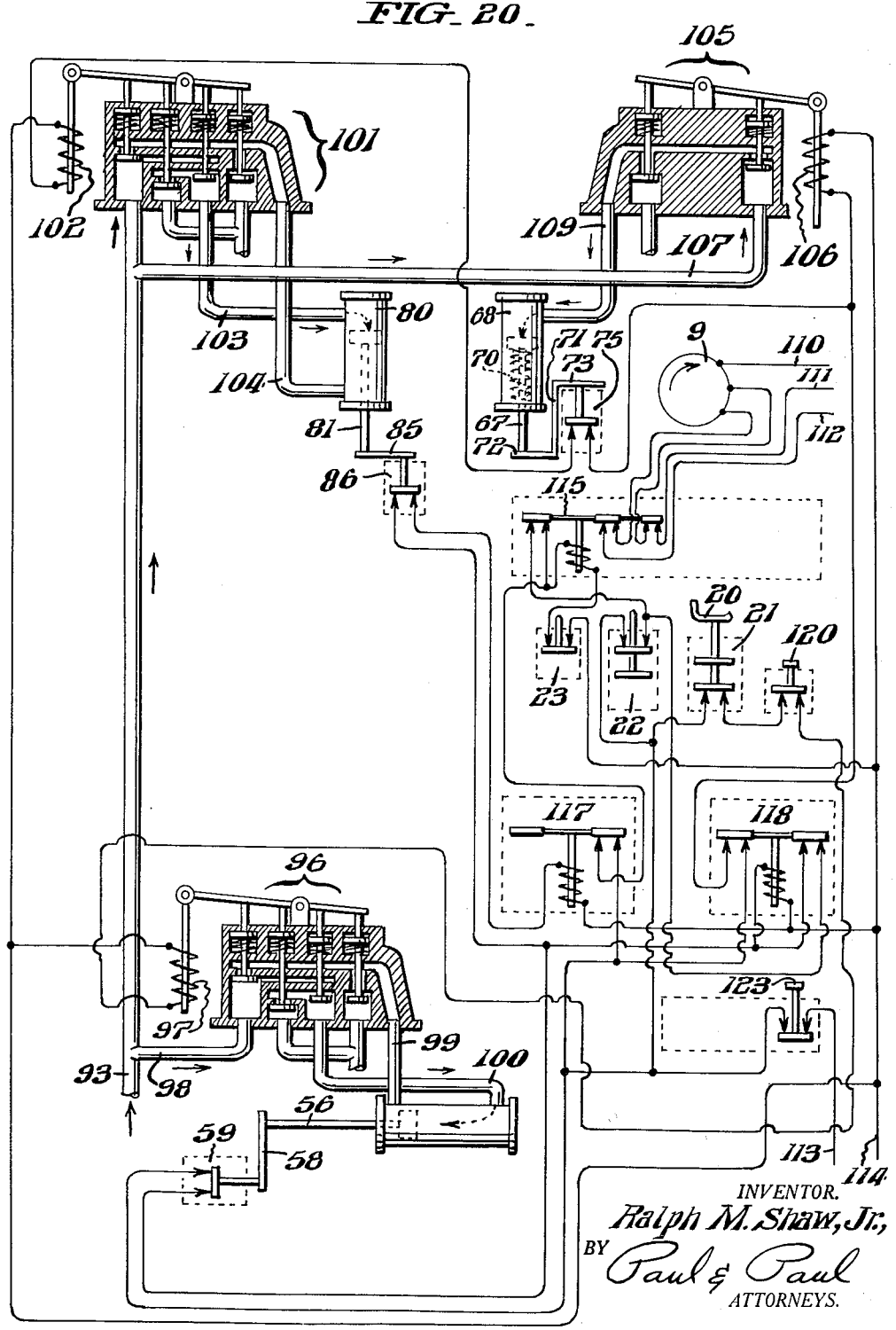

INVENTOR.
Ralph M. Shaw, Jr.,
BY Paul & Paul
ATTORNEYS.

Oct. 18, 1960 R. M. SHAW, JR 2,956,609
BENDING MACHINES
Filed Nov. 18, 1958 16 Sheets-Sheet 14

INVENTOR.
Ralph M. Shaw, Jr.,
BY Paul & Paul
ATTORNEYS.

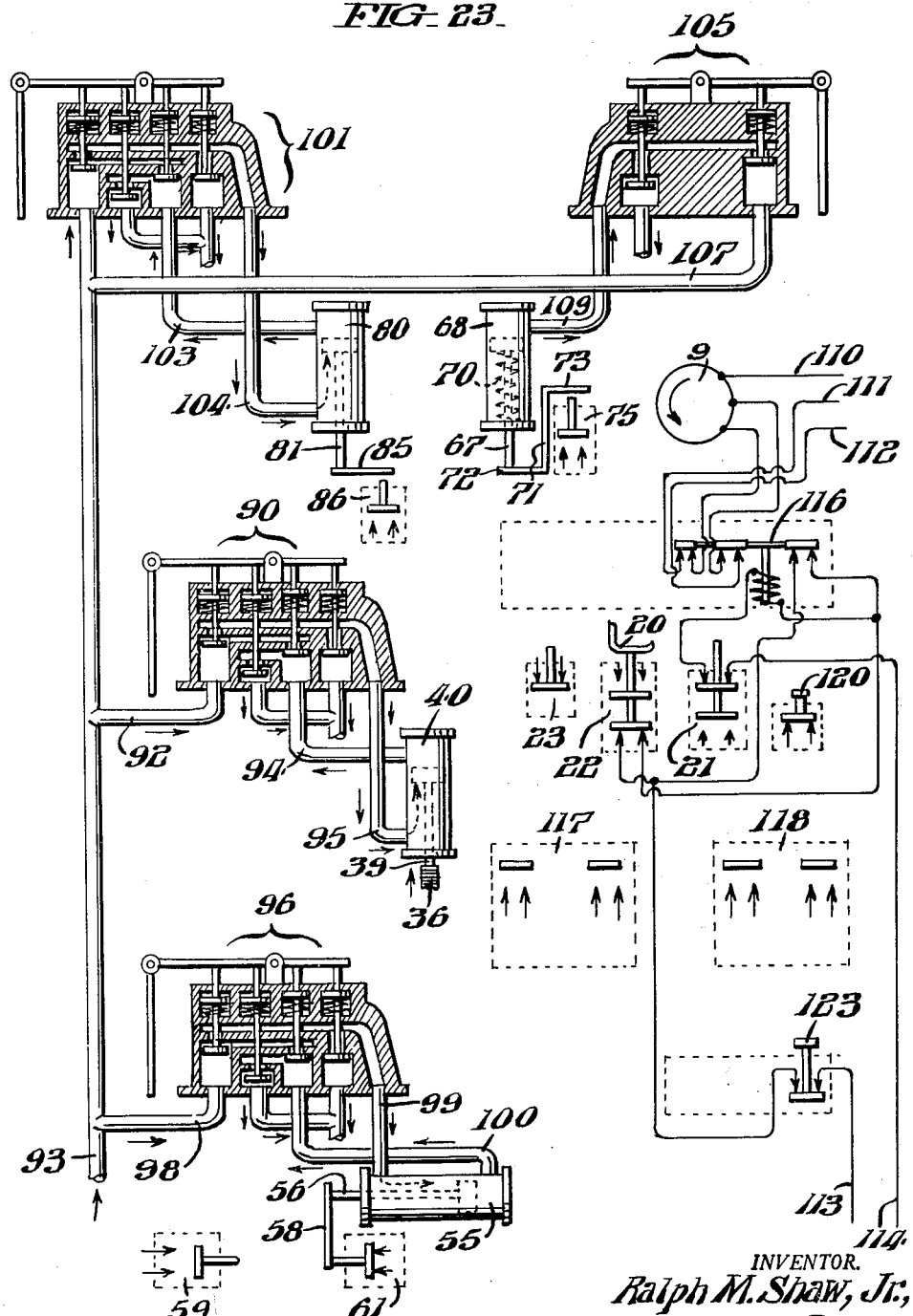

Oct. 18, 1960     R. M. SHAW, JR     2,956,609
BENDING MACHINES
Filed Nov. 18, 1958     16 Sheets-Sheet 16
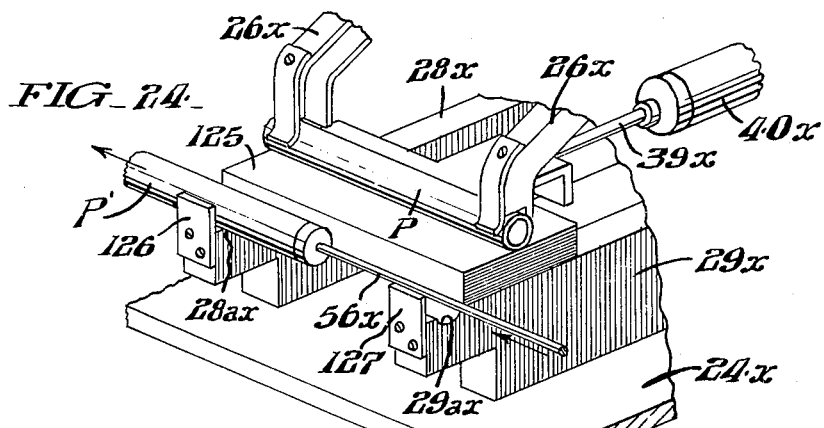
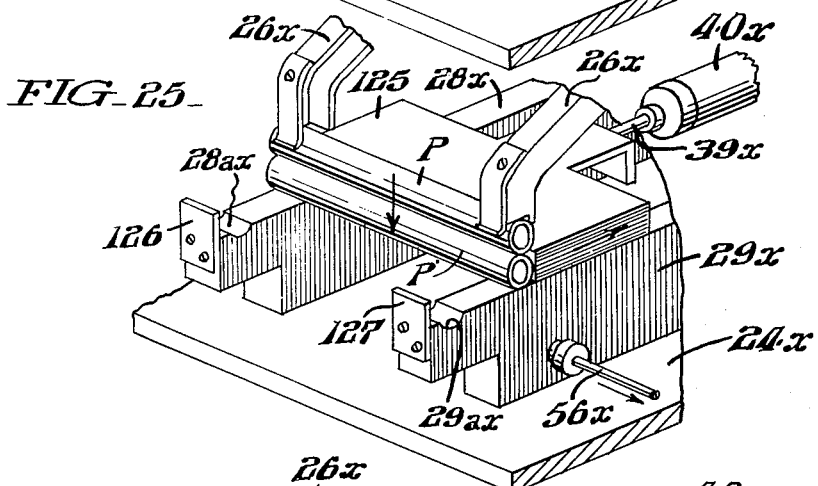
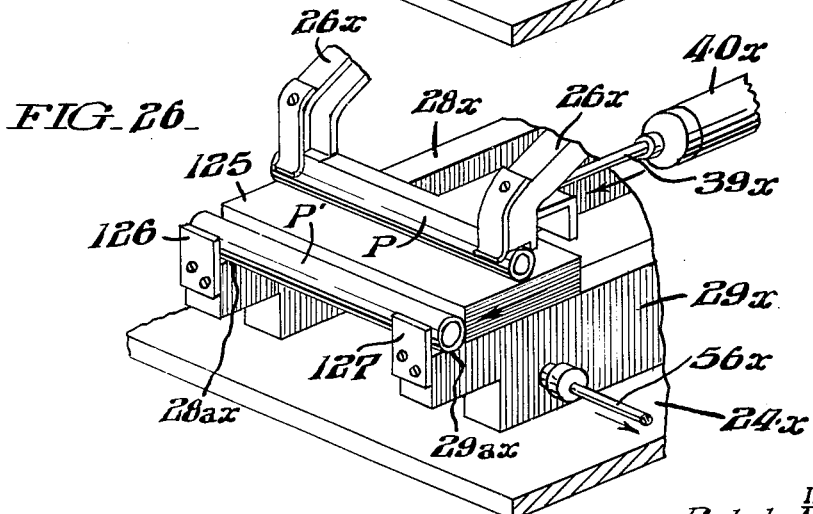
INVENTOR.
Ralph M. Shaw, Jr.,
BY Paul & Paul
ATTORNEYS.

United States Patent Office 2,956,609
Patented Oct. 18, 1960

2,956,609

BENDING MACHINES

Ralph M. Shaw, Jr., Edgewater Park, N.J., assignor to Pedrick Tool & Machine Company, Inc., Philadelphia, Pa.

Filed Nov. 18, 1958, Ser. No. 775,095

10 Claims. (Cl. 153—46)

This invention relates to bending machines, particularly bending machines generally of the type disclosed in U.S. Patent No. 2,369,923, granted to me on February 20, 1945, wherein elongate work pieces such as rods or tubes for example, are made to conform to the shape of a fixed die by the cooperative action of a forging element bodily moved about said die.

The chief aim of my present invention is to provide, in connection with a bending machine of the kind referred to, a simple and reliable mechanism by which the work pieces to be bent are successively released individually from a gravity discharge magazine into position for advancement endwise between the die and the cooperative forging element in readiness to be bent, and at the same time eject a previously bent work piece from the machine.

A further aim of my invention is to provide a simple and reliable control means for governing the operation of the machine to automatically carry out successive cycles during each of which a work piece is released from the magazine, is fed to the cooperative bending elements and, after being accurately bent to the desired configuration, is ejected from the machine.

Other objects and attendant advantages will appear from the following detailed description of the attached drawings wherein:

Figs. 1 and 2 respectively show, in front elevation and in top plan, a bending machine conveniently embodying the feeding and ejecting mechanism of my invention, portions being broken out in each of these illustrations to expose parts which otherwise would be hidden.

Figs. 3 and 4 are fragmentary views in section respectively taken as indicated by arrows III—III and IV—IV in Figs. 1 and 2.

Fig. 5 is a view in section corresponding to Fig. 4 with the movable parts differently positioned.

Figs. 6-9 are fragmentary views in perspective showing successive steps by which the work pieces are individually released from the gravity feeding magazine and positioned in the machine in readiness to be advanced to the bending elements.

Figs. 10-15 are fragmentary diagrammatic views in top plan showing successive steps in the operation of the machine to effect the bending; and Figs. 16-23 are wiring diagrams of the control means by which the functioning of the machine is automatically governed for cyclic operation.

Figs. 24-26 are views similar to Figs. 6, 8 and 9 showing a modified form of means for feeding the work pieces from the magazine.

The machine in general

Figure 10:
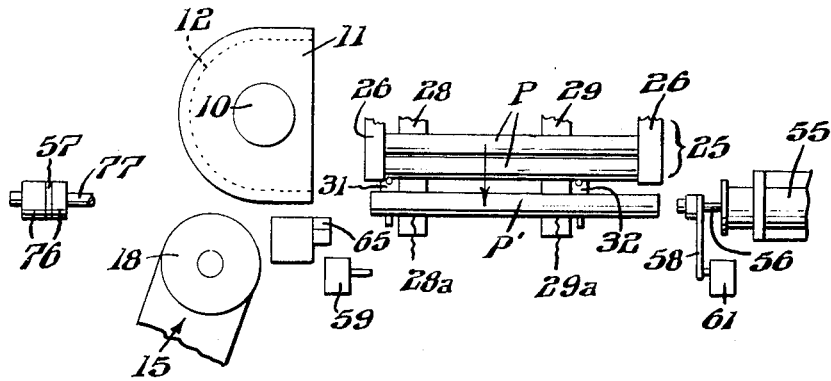

As herein exemplified, the machine has a pedestal base 1 whereon is supported a circular table 2 which has a recess 3 in its top coupled by a bull wheel 5 whereto is affixed a cover plate 6 in flush relation with the top of the table. Meshing with the bull wheel 5 is a spur pinion 7 affixed to the top end of the speed reducer shaft 8 of a reversible electric motor 9 set within the hollow of the base 1. Affixed to a post 10 projecting upward axially from the table 2 is a rounded die element 11 having a groove 12 which is cross sectionally configured to correspond with the cross section of the work pieces to be bent. A radial arm 15 secured to the bull wheel 5 is longitudinally slotted as at 16 for a slide 17 whereon is mounted a forging roller 18 which is adapted to cooperate with the die 11 in the bending, said slide being adjustable by means of a screw 19 for changing the position of said roller relative to the die block as may be desired or required. Pendent from the arm 15 adjacent its distal end is a spring tongue 20 for actuating a normally closed stop switch 21, a normally closed motor reversing switch 22 and a safety switch 23. As shown in Fig. 2, the switches 21, 22 and 23 are disposed in spaced relation about the periphery of table 2. These switches will be again referred to later.

Figure 11:
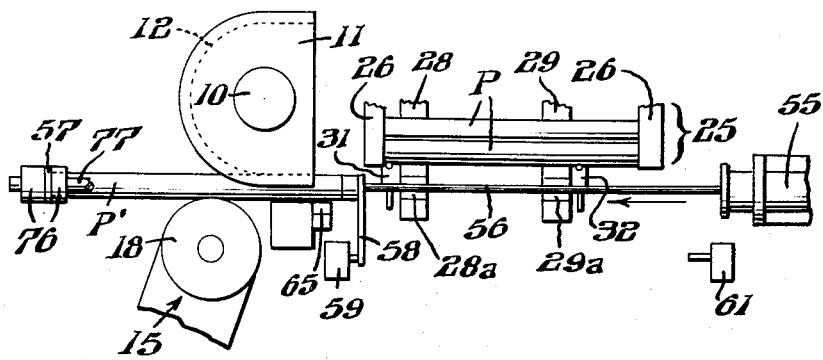
Figure 12:
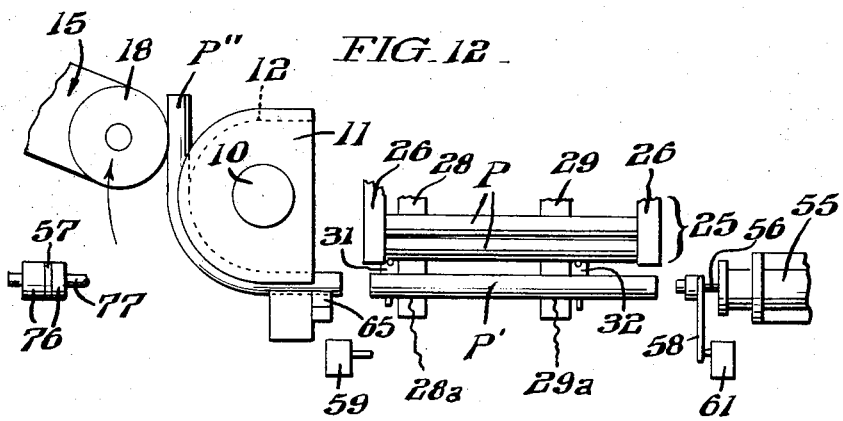

Bolted to the top of the table 2 to one side of the die block 11 is a platform 24 whereon is mounted a gravity feed magazine 25 comprising a pair of spaced parallel channel rails 26 which slope downwardly toward the platform, the hollows of said channel rails facing inwardly toward each other to receive the ends of the work pieces P to be individually bent. As best shown in Fig. 3, the rails 26 are supported by a bracket 27 bridged between a pair of parallel bars 28 and 29 lying crosswise of the platform 24, the delivery ends of said rails being directed downwardly for release of the work pieces successively onto said bars. Rotatably supported by the bars 28 and 29 is a shaft 30 to the protruding ends of which are secured wheels 31 and 32, each having four radial spokes. As the work pieces roll out of the bottom end of the magazine 25 they are temporarily arrested individually on the bars 28 and 29 by the spokes of the wheels 31 and 32. A spur pinion 33 is freely mounted on the shaft 30 at the center and carries a pawl 34 (Fig. 7) which is spring urged toward a ratchet wheel 35 fixed on the said shaft to one side of said pinion. The pinion 33 meshes with a toothed rack 36 fast upon a slide 37 constrained to endwise movement in a guideway 38 on the platform 24 located centrally between the bars 28 and 29, said rack being connected to the piston rod 39 of a double acting pressure fluid cylinder 40. During each forward and return movement of the piston rod 39 of the cylinder 40 and advance of the rack 36, a quarter turn is imparted through the pinion 33, pawl 34 and ratchet 35 to the shaft 30 and hence to the wheels 31 and 32, so that the work piece P' released from the magazine as above explained, is rolled forwardly on the bars 28 and 29 as in Fig. 8 until it falls into notches 28a and 29a in said bars as shown in Fig. 9. During the forward stroke of the rack 36, the pinion 33 turns freely on the shaft 30 as the pawl 34 glides idly over the teeth of the ratchet wheel 35. Overthrow of the shaft 30 at each actuation, is prevented by means including rack shaft 41 which is rotatively supported in a small bearing bracket 42, said shaft having secured to it, at one end, a finger 43 in the path of a laterally projecting lug 45 on the slide 37. To the opposite end of the rack shaft 41 is affixed a small lever 46 which, through a link 47, is connected to another lever 48 fulcrumed on a stud 49 projecting from the outer side of the bar 29 at the distal end of the latter. The lever has a finger 50 adapted to be swung over one of the spokes of the wheel 32, it being normally held in the position of Fig. 9 by a spring 51 influential upon the link 47. From Figs. 1 and 10-15 it will be noted that the notches 28a, 29a on the bars 28, 29 are in tangential alignment with one side of the groove 12 in the die block 11 and also in line with another double acting pressure fluid cylinder 55 on the rear end of the platform 24. As the piston rod 56 of the cylinder moves outward, the work piece P' is pushed forward endwise from the bars 28 and 29 as shown in Fig. 14 between the die block and the roller 18 on the arm 15 until it is finally positioned as shown in Fig. 15 and arrested by a stop 57. Extending laterally from the piston rod 56 of the cylinder 55 is a finger 58 which, as the rod moves forward, is adapted to actuate a switch 59 supported upon a bracket arm 60 affixed to the table 24 and overreaching the bull wheel 5. On the return movement of the piston rod 56, the finger 58 is adapted to actuate another switch 61, to the top of the platform 24. Upon being fully advanced, as explained above, the work piece P' is rigidly held to the side of the die block 11 by a clamp 65 which is fulcrumed upon a stud 66 projecting from the rear face of the die block 11 and is operable by virtue of connection to the piston rod 67 of a fluid pressure cylinder 68 pivotally suspended from the top of a post 69 affixed to the rear face of said die block. Thus upon admission of pressure fluid into the upper end of the cylinder 68, the piston rod 67 is forced downward against the resistance of the spring indicated at 70 to close the clamp 65 so that the work piece P' is firmly held to the die block 11 as in Fig. 4 during the bending. As further shown in Fig. 4 a rod 71 extends upward from a lateral projection 72 on the piston rod 67 of the cylinder 68, and at the top has a finger 73 for actuating a switch 75 mounted to the side of the post 69 when the clamp 65 is moved to active position. The stop 57, hereinbefore referred to, is in the form of a finger freely suspended between a pair of adjustable collars 76 from a rod 77 supported by a bracket arm 78 from the top of the die block 11 as shown in Figs. 1 and 2. Also, pivotally suspended from the top of the post 69 is a double acting pressure fluid cylinder 80 whereof the piston rod 81 is connected to an arm 82 fulcrumed at 83 to a small bracket 84 at the top of the die block 11. To the piston rod 81 of the cylinder 80 is secured a laterally projecting spring tongue 85 which is adapted to actuate another switch 86 supported by the bracket 60 adjacent the switch 59.

*Control means*

Figure 21:
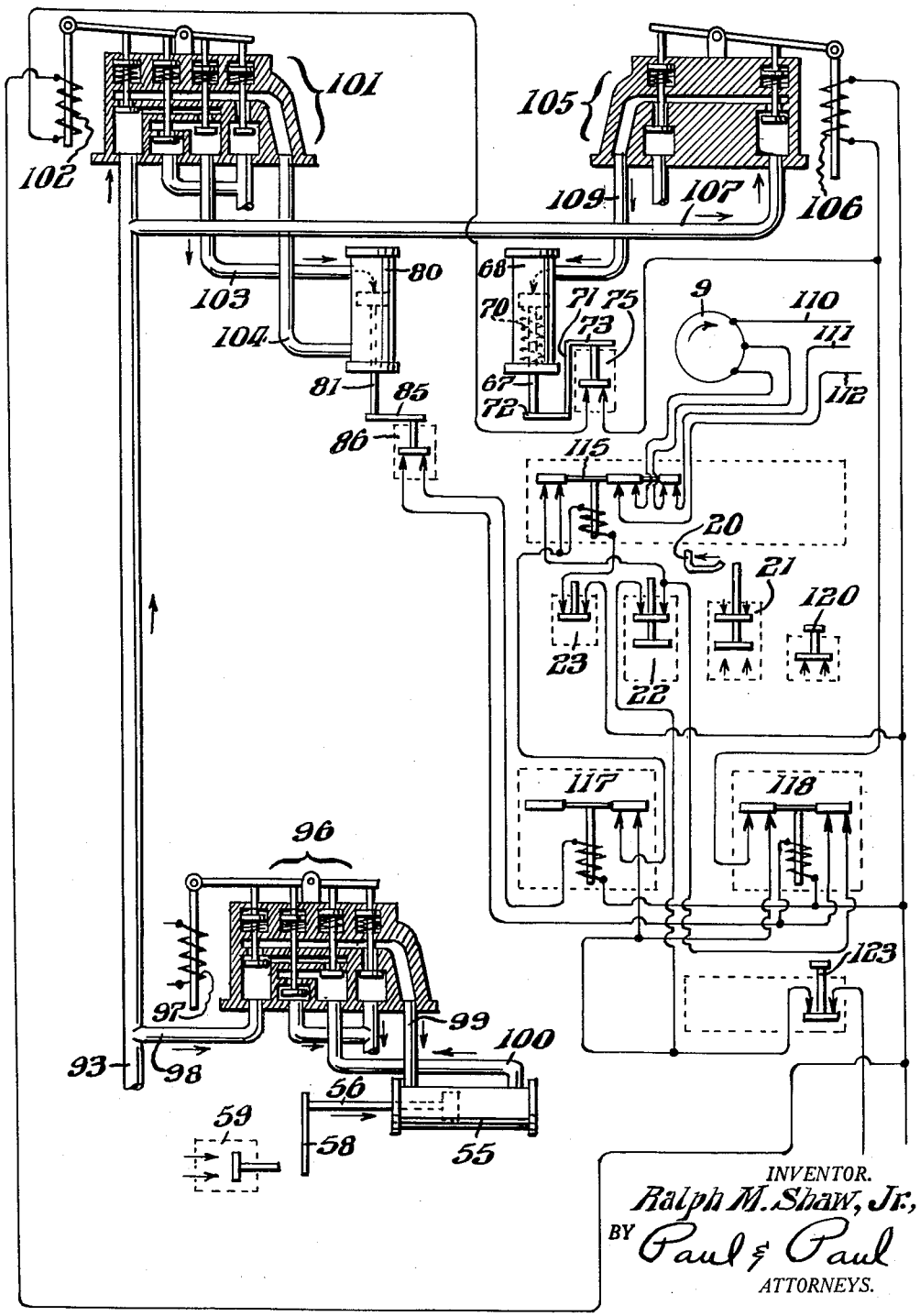
Figure 22:
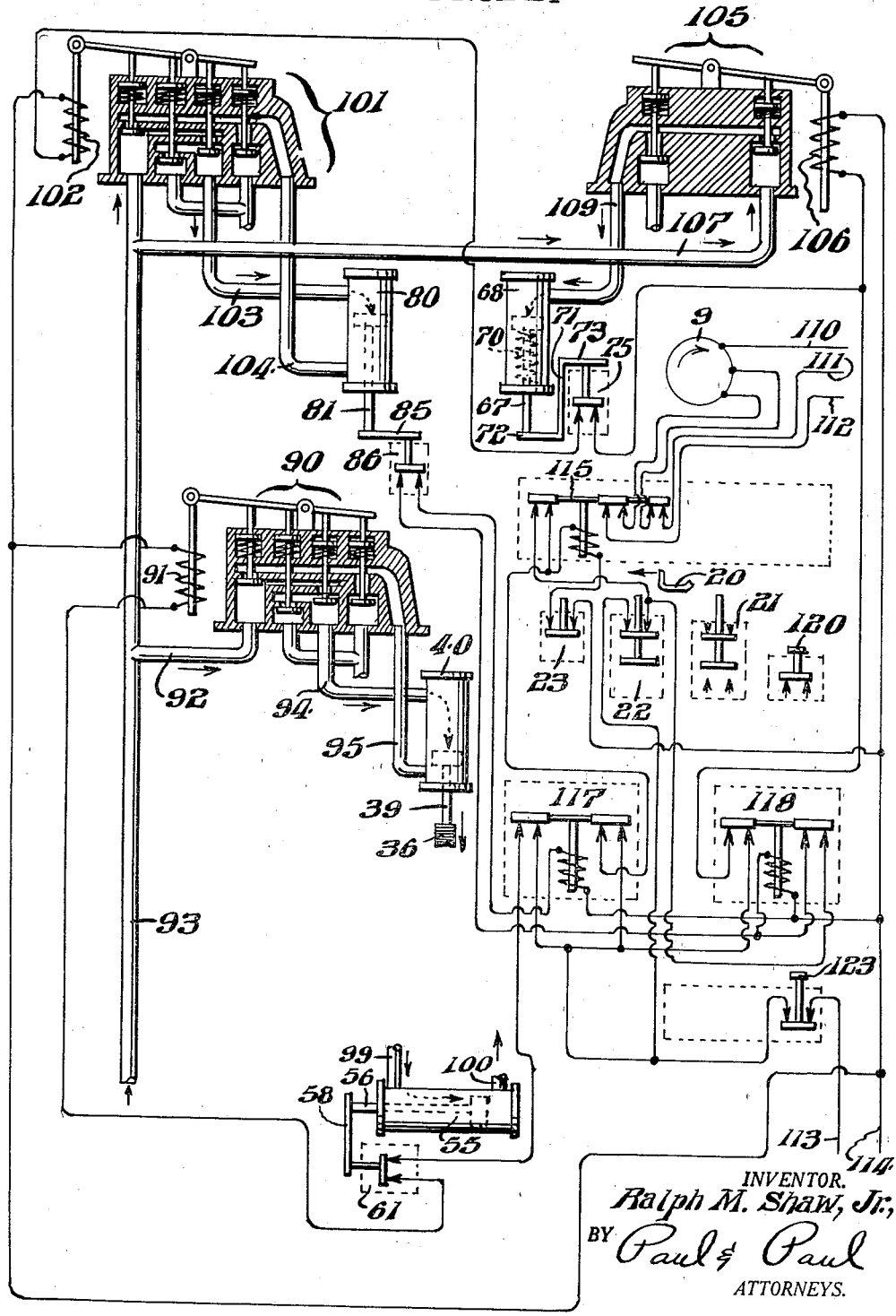

By reference now to Figs. 16–23, it will be seen that I have provided a four-way valve 90 for governing the supply of motivating fluid (which may be compressed air) to the cylinder 40, said valve being operable by means of solenoid 91. As shown, the valve 90 is connected by a branch pipe 92 to a supply main 93 for the pressure fluid, and is also connected by conduits 94 and 95, respectively, to opposite ends of the cylinder 40. A similar valve 96 operable by a solenoid 97 is connected, by a branch pipe 98, to the air supply main 93 and, through conduits 99 and 100 respectively, to opposite ends of the cylinder 55. Still another similar valve 101, operable by a solenoid 102, is connected to the supply main 93, and also through conduits 103 and 104 respectively, to opposite ends of cylinder 80. A fourth valve indicated at 105 and operable by a solenoid 106 is relied upon to govern supply and exhaust of the pressure fluid to the opposite ends of the cylinder 68, said valve being connected with the supply main 93 by a conduit 108, and to said cylinder by a conduit 109. Electric current for operating the motor 9 is supplied from a three-phase high voltage A.C. power line 110, 111, 112; while the current for energizing the solenoids of the several control valves is supplied from a two wire power line 113, 115 at a lower voltage. In addition to the switches 59, 61, 75 and 86 hereinbefore mentioned, there are shown in Figs. 16–23, starters 115 and 116 respectively, for determining forward and reverse driving of the motor 9, two auxiliary relays 117 and 118 of which the functions will be presently described, a master start switch 120 and supplemental forward, reverse and stop switches 121, 122 and 123 respectively, all of the latter switches being located for convenience of ready access thereto, at the front of the machine as shown in Figs. 1 and 2. In Fig. 16, the control system is shown in its dormant state.

*Operation*

The machine is started in operation by closing the master switch 120 as in Fig. 17, whereupon current flow will take place only in the circuits there shown with resultant energization of the solenoid 97 and actuation of the valve 96. Pressure fluid from the main 93 is thereby admitted to the rear end of the cylinder 55 and a previously released work piece P' resting in the notches 28a, 29a respectively, of the bars 28 and 29 is advanced by the wheels 31, 32 from the position of Fig. 10 into position between the die 11 and roller 18 as in Fig. 11. As the piston rod 56 of the cylinder 55 starts its outward movement, the switch 61 opens, and as said piston reaches the end of its forward stroke, the switch 59 is closed with consequent current flow in the circuits shown in Fig. 18, and energization of the solenoid 106 to actuate the valve 105 for admission of pressure fluid from the main 93 into the upper end of the cylinder 68 whereby a circuit is established to actuate relay 118. By advance of the piston 67 of the cylinder 68, the switch 75 is eventually closed as in Fig. 19 with attendant establishment of the circuit to energize the solenoid 102 for actuation of the valve 101 to admit pressure fluid from the main 93 into the upper end of the cylinder 80. By operation of the cylinder 80 the switch 85 is closed, as in Fig. 20, for establishment of a circuit to actuate the relays 115 and 117 as in Fig. 20 whereby the motor 9 is started in forward rotation to cause the roller arm 15 to move clockwise and bend the work piece about the die 11 as in Fig. 12. As the projection 20 on the roller arm 15 leaves the switch 21, said switch moves to the position of Fig. 21 to break the circuit to the solenoid 97 of valve 96. As a consequence, the valve 96 resumes its normal position and allows pressure fluid from the main 93 to enter the forward end of cylinder 55 as in Fig. 21. In being retracted the piston 56 of cylinder 55 opens the switch 59, and, upon full retraction of said piston, the valve 61 is closed thereby establishing the circuit through the solenoid of valve 90 as in Fig. 22, valve 90 being thereby actuated to admit pressure fluid into the rear end of the cylinder 40. The piston 39 of the cylinder 40 is thereupon again advanced to actuate the rack 36 for release of another work piece from the magazine 25 and placement of such work piece on the notches of the bars 28 and 29. As the projection 20 on the roller arm 15 encounters the switch 22, said switch is moved to the position of Fig. 23 with the result that the relays 115, 117 and 118 are opened and the relay 116 is closed for reverse rotation of the motor 9 and return of the roller on arm 15 to the position of Fig. 13 after the work piece has been bent. Upon re-engagement of the projection 20 on the roller arm 15 with the switch 21, the above cycle is repeated as long as the master switch 120 is kept in closed position for advance each time of a newly released work piece P' between the die 11 and the roller 18, resetting of the clamp 65 and placement of the machine in operation to bend the newly released work piece in the same manner. In this connection, it is to be noted from Fig. 14, that as a new work piece P' is advanced to position between the die 11 and the roller 18, the previously bent work piece P'' is ejected from the machine.

In the event the motor 9 should overrun in its forward rotation and the roller arm 15 be moved clockwise beyond the switch 22, the machine will be automatically stopped upon encounter of the projection 20 on said arm with the safety switch 23, as will be readily understood from the diagrams. If the machine should jam or maloperation should occur, it can be stopped at any time simply by opening the stop switch 123. Furthermore, forward and reverse operation of the motor 9 may be manually controlled if occasion should require it, by closing the manual switches 122 and 123 respectively.

While, as herein shown, the machine is arranged to bend the work pieces to an angle of ninety degrees, obviously, by adjusting the switches 122 and 123 about the table 2, it can be adapted for the bending of work pieces to angles either less than or greater than ninety degrees, in accordance with specified requirements to be satisfied in practice.

While in accordance with the provisions of the statutes, I have illustrated and described the best forms of embodiment of my invention now known to me it will be apparent to those skilled in the art that changes may be made in the form of the apparatus described without departing from the spirit and scope of the invention, as set forth in the appended claims, and that in some cases certain features of my invention may be used to advantage without a corresponding use of other features.

Having thus described my invention, I claim:

1. In a machine for angularly bending work pieces such as tubes or bars; a fixed die element; a cooperative forging element; means operable at each actuation to move the forging element bodily about the die element from a retracted starting position to effect the bending, and for returning it to the starting position after the bending; a gravity magazine for the work pieces; means operable at each actuation to release an individual work piece from the magazine onto a temporary support in readiness for advancement endwise between the die element and the cooperative forging element when said forging element is retracted; and means for so advancing the released work peice from said temporary support.

2. The invention according to claim 1, wherein the releasing means includes a shaft having affixed thereto in spaced relation a pair of intermittently rotated wheels respectively provided with radial projections between which the lowermost work piece in the magazine is engaged and by which each work piece is moved from the outlet of the magazine to a position on the temporary support in readiness to be advanced between the die element and the forging element.

3. The invention according to claim 1, further including stop means for limiting the advance of each work piece to definitely position it in relation to the bending elements.

4. The invention according to claim 1, further including a clamp for holding the work piece to the die element during the bending; and means for closing the clamp upon advance of the work piece into position between the die element and the forging element and for opening said clamp after the work piece has been bent.

5. The invention according to claim 1, on which the temporary support is provided with a restraining notch for the work piece released from the magazine, said notch being aligned with the interval between the die element and the forging element when the latter is retracted, whereby upon advance of such work piece into position, the previously bent work piece is ejected from the machine.

6. The invention according to claim 1, wherein the forging element is in the form of a roller on an arm fulcrumed to swing about the axis of the die; wherein the means for moving the arm comprises a reversible electric motor and interposed drive connections between it and the arm; and switches actuated by the arm as it reaches the ends of its movements in opposite directions for causing alternate reversals in the drive of the motor.

7. The invention according to claim 6 wherein one of the switches is supported with capacity for positional adjustment relative to the other to vary the angle to which the work pieces are bent.

8. The invention according to claim 1 further including a control means for determining cyclic operation of the machine and comprising instrumentalities to cause, during each cycle, actuation of the work piece releasing means, actuation of the work piece advancing means, actuation of the clamp means, and actuation of the forging element in the stated order.

9. In a machine for angularly bending work pieces such as tubes or rods; a fixed die; an arm fulcrumed about the axis of the die and carrying a forging roller to cooperate with the die in the bending; a reversible electric motor and interposed driving instrumentalities for moving the arm from a retracted starting position to cause the roller to co-act with the die in the bending and to return said arm to retracted position after the bending; a gravity magazine for the work pieces; release means operable at each actuation to release an individual work piece from the magazine onto a temporary support in readiness for advancement endwise between the die and the roller when the arm is retracted; a clamp for holding the work piece rigidly to the die during the bending; pressure fluid cylinders with piston rods respectively, for actuating the release means, the advancing means and the clamp means; individual solenoid valves operable to admit and exhaust pressure fluid to and from said cylinders; and automatic control means for governing current supply to the solenoids of the several aforesaid valves and for reversals of the motor such that, for each cycle, a work piece is released from the magazine, then advanced between the bending elements, the clamp means then actuated to hold the work piece to the die element in readiness for the bending, the motor then started in forward rotation to move the arm in one direction to effect the bending, and the motor thereupon reversed in its rotation for return of the arm to its retracted position.

10. In invention according to claim 1, wherein the releasing means includes a reciprocated cross head slidingly sustained upon the temporary support, said cross head being adapted upon retraction, to release the lowermost work piece from the magazine and upon being moved forwardly, to restrain the next work piece in the magazine and at the same time shift the newly released work piece to a position on the temporary support in readiness to be advanced endwise between the die and the forging element.

References Cited in the file of this patent

UNITED STATES PATENTS

| | | |
|---|---|---|
| 2,369,923 | Shaw | Feb. 20, 1945 |
| 2,782,832 | Shaw | Feb. 26, 1957 |